(12) United States Patent
Mamat

(10) Patent No.: US 11,919,037 B2
(45) Date of Patent: Mar. 5, 2024

(54) LEATHER EDGE PAINTING AND PROCESS THEREOF

(71) Applicant: K H EXPORTS INDIA PRIVATE LIMITED, Chennai (IN)

(72) Inventor: Omer Suat Mamat, Chennai (IN)

(*) Notice: Subject to any disclaimer, the term of this patent is extended or adjusted under 35 U.S.C. 154(b) by 0 days.

(21) Appl. No.: 17/906,157

(22) PCT Filed: Mar. 11, 2021

(86) PCT No.: PCT/IN2021/050240
§ 371 (c)(1),
(2) Date: Sep. 12, 2022

(87) PCT Pub. No.: WO2021/181419
PCT Pub. Date: Sep. 16, 2021

(65) Prior Publication Data
US 2023/0173538 A1    Jun. 8, 2023

(30) Foreign Application Priority Data
Mar. 13, 2020   (IN) .............................. 202041010873

(51) Int. Cl.
*B05D 5/02*  (2006.01)
*B05D 1/28*  (2006.01)
(Continued)

(52) U.S. Cl.
CPC ............... *B05D 7/12* (2013.01); *B05D 1/286* (2013.01); *B05D 3/0254* (2013.01); *C14B 11/00* (2013.01);
(Continued)

(58) Field of Classification Search
CPC ................................ B05D 1/286; C14B 11/00
See application file for complete search history.

(56) References Cited

U.S. PATENT DOCUMENTS

| | | | |
|---|---|---|---|
| 439,536 A | 10/1890 | Maxwell | |
| 1,629,165 A | 5/1927 | Johnston | |

(Continued)

FOREIGN PATENT DOCUMENTS

| | | |
|---|---|---|
| KR | 20030009233 A | 1/2003 |
| WO | 2019175893 A1 | 9/2019 |

OTHER PUBLICATIONS

International Search Report & Written Opinion dated Jun. 21, 2021 from PCT Application No. PCT/IN2021/050240, 8 pages.
(Continued)

*Primary Examiner* — Dah-Wei D. Yuan
*Assistant Examiner* — Kristen A Dagenais
(74) *Attorney, Agent, or Firm* — INNOVATION CAPITAL LAW GROUP, LLP; Vic Lin

(57) ABSTRACT

The present invention relates to a process for leather edge painting. More particularly, the present invention relates to the process [200] wherein the liquid edge paint is converted to solid colour sticker film [205]. More particularly, the present invention relates to the process wherein the liquid edge paint is converted to solid colour sticker film on a transparent film [205], and transferring [207] from the transparent paper to the edges of a substrate material. Further, the process of the present invention provides liquid edge paint transferred to the substrate edge for one or more applications.

5 Claims, 5 Drawing Sheets

(51) Int. Cl.
  *B05D 3/02* (2006.01)
  *B05D 7/12* (2006.01)
  *C14B 11/00* (2006.01)
(52) U.S. Cl.
  CPC ...... *B05D 2203/24* (2013.01); *B05D 2401/20* (2013.01)

(56) References Cited

U.S. PATENT DOCUMENTS

| | | |
|---|---|---|
| 2,029,377 A | 2/1936 | Kaplan |
| 3,794,544 A | 2/1974 | Eckert et al. |
| 3,930,921 A | 1/1976 | Connett |
| 5,298,072 A | 3/1994 | Schiele et al. |
| 5,643,982 A | 7/1997 | Liu |
| 5,941,101 A | 8/1999 | Callo |
| 5,944,931 A | 8/1999 | Cranford |
| 5,948,586 A | 9/1999 | Hare |
| 6,835,268 B2 | 12/2004 | Widman |
| 10,870,897 B2 * | 12/2020 | Mamat ...................... D06P 5/08 |
| 2002/0146544 A1 * | 10/2002 | Kronzer .................. D06P 5/003 428/32.81 |
| 2004/0245490 A1 | 12/2004 | Schopke et al. |

OTHER PUBLICATIONS

International Search Report dated Mar. 4, 2019 from PCT Application No. PCT/IN2018/050783.

* cited by examiner

LEATHER EDGE PAINTING AND PROCESS THEREOF

FIELD OF THE INVENTION

The present invention relates to a process for leather edge painting. More particularly, the present invention relates to the process wherein the liquid edge paint is converted to solid colour film on a transparent film, and transferring from the transparent paper to the edges of a substrate material. Further, the process of the present invention provides liquid edge paint transferred to the substrate edge for one or more applications. Advantageously, the present invention effectively saves time and material wastage.

BACKGROUND OF THE INVENTION

Generally, in the field of leather processing, edge coloring treatment is a very important stage, usually leather shaders are used for achieving colored leather, which includes ink cartridge and ink wheel, the ink is applied to the surface of the leather during rotation of ink wheel.

Known in the art is a process of leather edge coloring, using ink cartridge and a roller assembly, the ink in the ink cartridge by rolling the wheel of the wheel assembly achieves operation of leather coloring, but its larger diameter roller is only suitable for conventional shape leather, and there is a certain degree of difficulty in coloring. The coloring using smaller diameter rollers, will result in a smaller volume of the ink cartridge and the ink cannot be fully utilized by the colored wheel and leads to wastage of ink.

U.S. Pat. No. 5,298,072 describes a system for coating the edges of panels (and other types and forms of work pieces in which the panel is moved along a conveyor past a painting station, so that the edge of the panel moves longitudinally past the applicator head, which serves as both a spray head to apply the paint and a vacuum head to remove excess paint. The applicator head is shaped to have a complementary shape to the shape of the edge of the panel, and as the panel moves past the applicator head, paint is applied and excess paint is removed to leave the smooth finish. Problems with this prior art system are found in uneven coating of the applied liquid on the work piece, undesired buildup of the liquid on parts of the system and high cost of maintenance.

Accordingly, there exists a need for a simple and efficient process that lessens the burden of painful edge painting procedures by reducing wastage such as ink, water and material, and further saves lead-time and energy as well.

OBJECT OF THE INVENTION

It is the primary object of the present invention to enhance edge painting process by adding new aesthetic look to the products.

It is another object of the present invention to simplify surface cleaning and avoid first and second coat application difficulties.

It is another object of the present invention to improve existing edge painting processes.

It is another object of the present invention to use single or mixed colors, degradation or multiple colors in edge painting process.

It is another object of the present invention to save time and energy in terms of work, cleaning, application, heating time for drying, buffing and to reduce wastage such as ink, material, water, etc.

It is another object of the present invention to provide a process for edge colouring, comprising sticker edge paint on transfer paper which is transferred to the substrates or to the edges using heat; and adding optionally coating with finishing coat comprising of mat or gloss color or paint.

It is another object of the present invention spraying liquid edge paint on transparent sheet to form a solid colour or paint as a thin layer with the help of metal roller on the transparent sheet.

It is another object of the present invention to remove transparent paper after attachment and trim both sides using hand tool or heated surface for permanent print attachment.

It is another object of the present invention to apply adhesion promoter on edge side of leather strap without buffing using hand or roller.

It is another object of the present invention to dry the leather strap for predefined time and apply sticker edge paint on edge of the leather strap after drying.

It is another object of the present invention to heat the dried leather strap after drying for certain period using heat control roller tool at predefined temperature for predefined time.

It is another object of the present invention to cool the heat exposed leather strap for certain period and remove the sticker edge paint on the edges side.

It is another object of the present invention to apply mat finish coat on the sticker edge paint using hand or roller and keep the leather strap for predefined time in a dry place for drying.

It is another object of the present invention to apply glossy finish coat using hand or roller and keep the leather strap for predefined time in a dry place for drying.

It is another object of the present invention wherein, the mat or glossy coat applications is by using hand or roller machine.

It is another object of the present invention to use manual tool or machine for the edge spray tool and metal roller to make edge paint sticker.

SUMMARY OF THE INVENTION

One or more of the problems of the conventional prior arts may be overcome by various embodiments of the present invention.

It is a principal aspect of the present invention to provide a method for edge coloring/edge painting of leather substrates, comprising the steps of:
  burnishing the edges of the leather substrate;
  application of adhesion promoter on the edges of the leather substrate in the range 0.1-0.3 mm;
  and drying for a period of 1-2 min at room temperature;
  application of adhesion promoter on the sticker film;
  pouring of the liquid edge paint on the transfer film to convert it into solid edge colour paint as a sticker film; and
  transfer of the edge paint sticker film to the edge of the leather substrate followed by application of heat 110-130° C. and pressure 60-70 PSI $kg/cm^2$ and removal of the sticker film,
    wherein the edge paint is a liquid which when poured on the transfer film with adhesion promoter is converted to solid colored sticker film and is transferred to the edge of leather substrate on application of temperature and pressure.

It is another aspect of the present invention to provide a method for edge coloring/edge painting of leather substrates, wherein the adhesion promoter comprises of Aziridine in demineralized water at a concentration of 25-35% w/v.

It is another aspect of the present invention to provide a method for edge coloring/edge painting of leather substrates, wherein the thickness of the solid colour film on the leather substrate ranges from 0.06 mm to 0.08 mm.

It is another aspect of the present invention to provide a method for edge coloring/edge painting of leather substrates, comprising the steps of:
- burnishing the edges of the leather substrate;
- application of adhesion promoter on the edges of the leather substrate (thin layer thickness);
- drying for a period of 1-2 min at room temperature;
- application of adhesion promoter on the sticker film;
- pouring of the liquid edge paint on the transfer film to convert it into solid edge colour paint;
- transfer of the edge paint from the sticker film to the edge of the leather substrate by application of heat 110-130° C. and pressure 60-70 PSI kg/cm$^2$ and and removal of the sticker film; and
- application of finishing coat,
    wherein the edge paint is a liquid which when poured on the transfer film with adhesion promoter is converted to solid colour and is transferred to the edge of leather substrate on application of temperature and pressure.

It is another aspect of the present invention to provide a method for edge coloring/edge painting of leather substrates, wherein the finish coat comprises of conventional liquid colour coat.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limitation of the invention's scope as it may admit to other equally effective embodiments.

DESCRIPTION FOR DRAWINGS WITH REFERENCE NUMERALS

Figure 1:
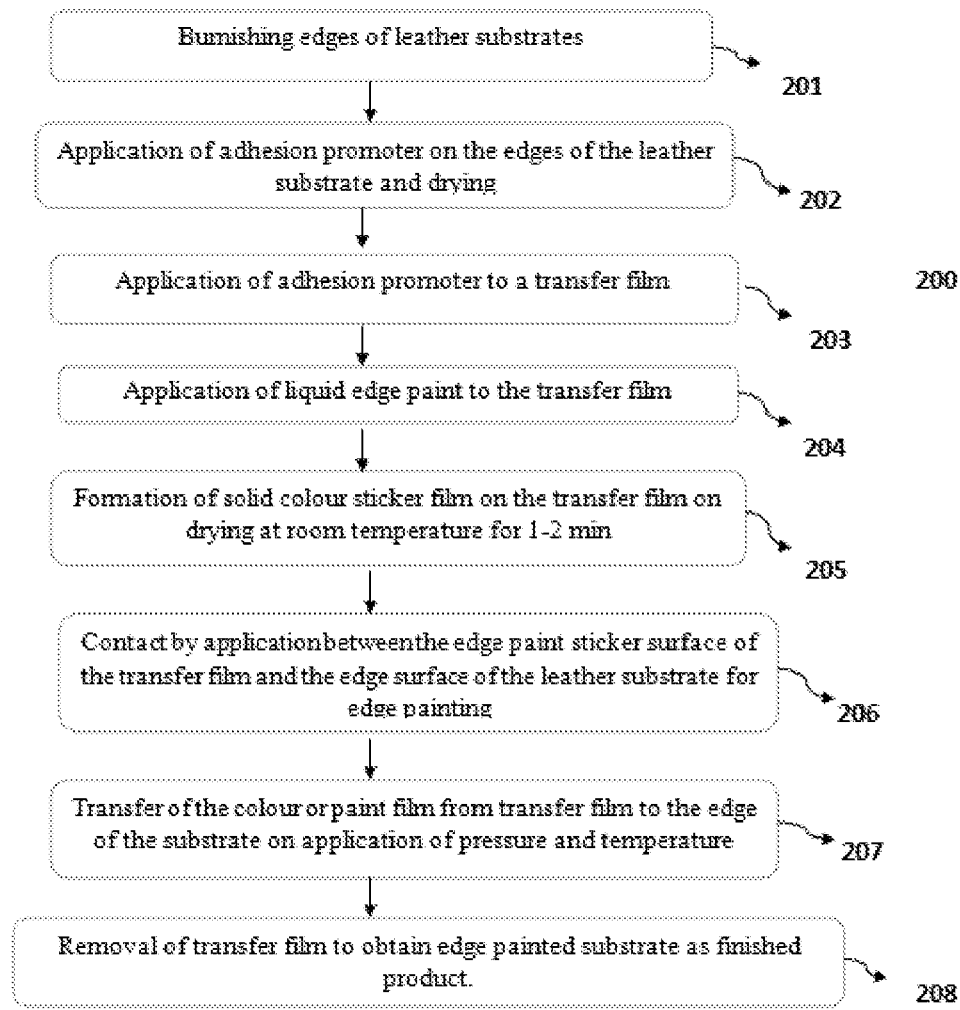
FIG. 1: illustrates the flowchart of the method for edge colouring on edges of a leather substrate according to one embodiment of the present invention.
Figure 2:
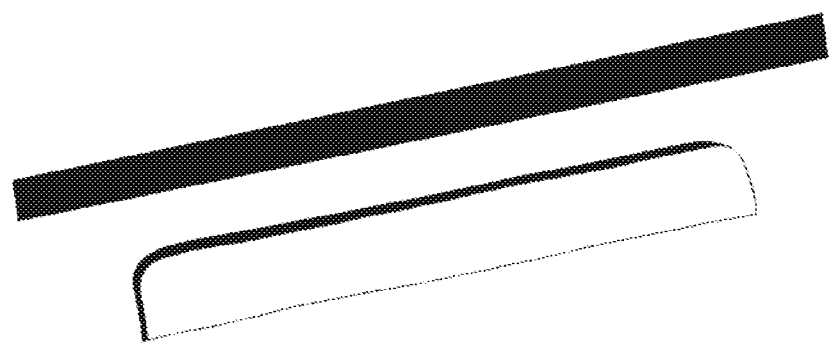
FIG. 2: illustrates leather strap and sticker edge paint without buffing according to one embodiment of the present invention.
Figure 3:
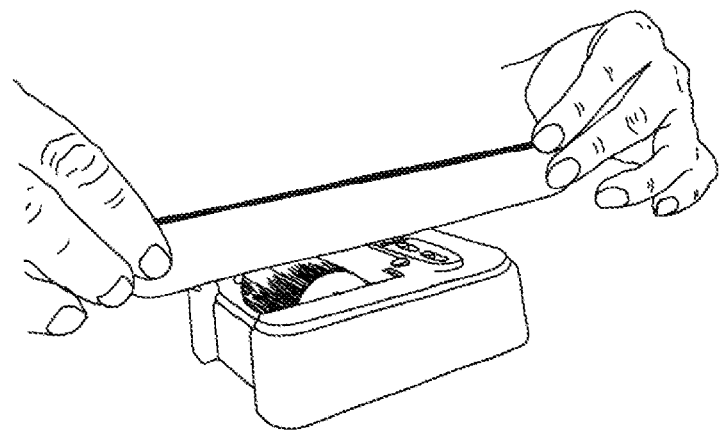
FIG. 3: illustrates application of promoter (1$^{st}$ coat) on edge side according to the present invention
Figure 4:
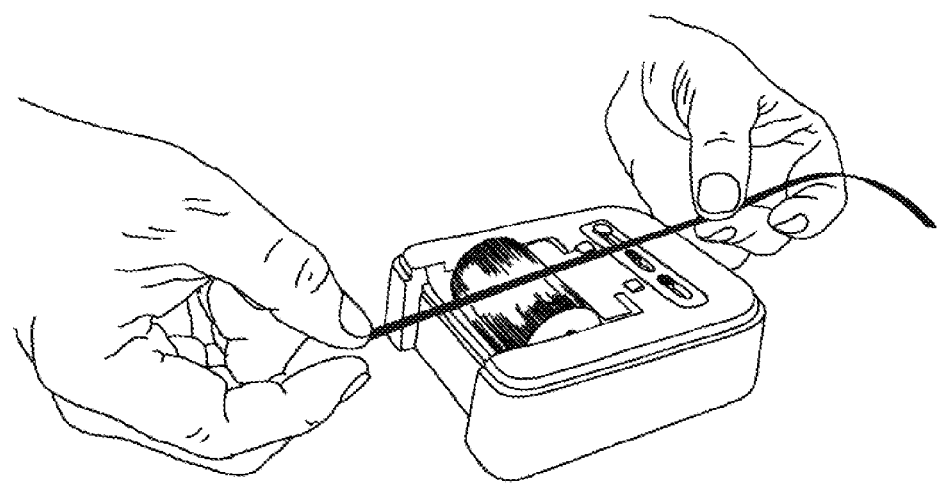
FIG. 4: illustrates application of promoter (1$^{st}$ coat) on sticker edge paint according to the present invention.
Figure 5:
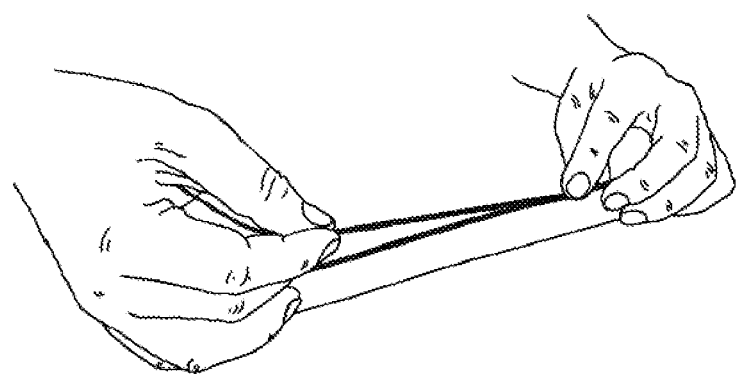
FIG. 5: illustrates attachment of sticker edge paint on edge according to the present invention.
Figure 6:
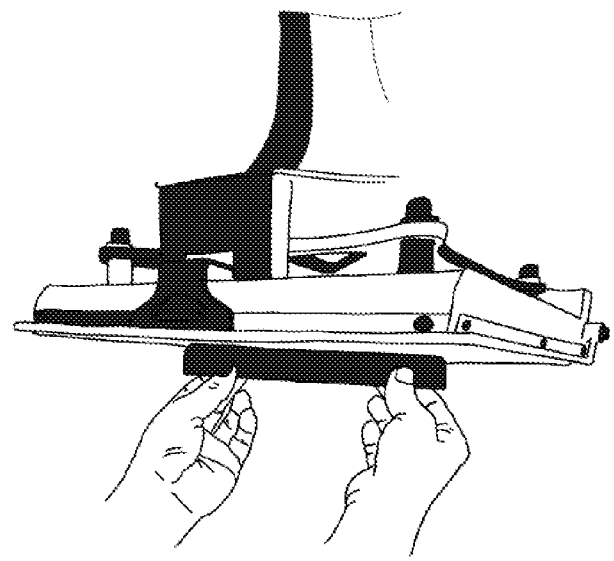
FIG. 6: illustrates the heat fixed edge according to the present invention.
Figure 7:
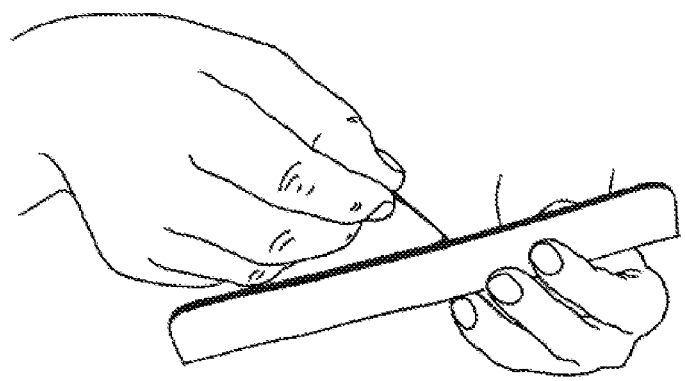
FIG. 7: illustrates removal film from sticker edge paint on the edge side according to the present invention.
Figure 8:
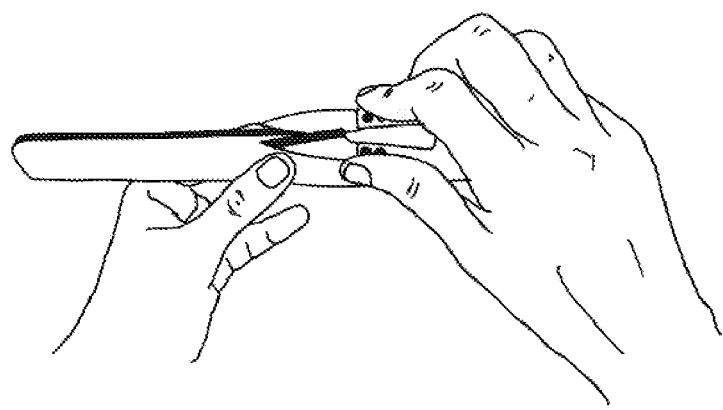
FIG. 8: illustrates trimming of sticker edge paint according to the present invention.
Figure 9:
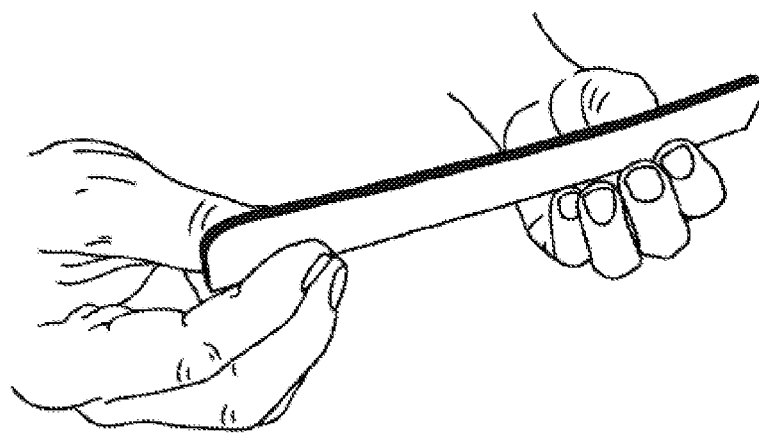
FIG. 9: illustrates final picture of strap after all the process of present invention.

Method for edge coloring of leather substrates
Burnishing the edges of the leather substrate
Application of adhesion promoter on the edges of the leather substrate
Application of adhesion promoter on the sticker film
Application of liquid edge paint on the transfer film
Formation of solid colour sticker film on the transfer film
Contact by application between the edge paint sticker surface of the transfer film and the edge surface of the leather substrate
Transfer of the colour or paint film from transfer film to the edge of the substrate on application of Heat and Pressure.
Removal of transfer film to obtain edge painted substrate as finished product.

DETAILED DESCRIPTION OF THE INVENTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The present invention relates to an improved method for application of leather edge painting.

Leather edge paint or colour is generally a liquid and processes of the prior art discuss various methods for application of liquid edge paint or colour on leather substrates. The present invention has devised a simple, economical and less tedious process of application of edge paint to the leather substrates. The method relates to conversion of the liquid edge paint into a solid colour film which is applied to the leather substrate edge by means of application of pressure at selected temperatures, such that the solidified film is transferred to the edge. Further, the present invention enables in application of paint or colour to the substrate edge surface for desired applications. Advantageously, the present invention effectively saves time and material wastage.

Referring to FIG. 1, it illustrates the method (200) for edge coloring or painting of leather substrates according to embodiments of the present invention. The leather substrate is any substrate made of leather and requires the painting or coloring on its surface. The colour comprises of edge paint or conventional edge colour. The method of the present invention provides a solid colour sticker film for direct adhesion on the edge of the substrate as a quick process of edge painting. The substrate is surface which needs to be colored by the edge paint is burnished (201). Application of adhesion promoter on the surface of substrate (202) as a uniform coating followed by allowing it to dry at room temperature for 1-2 min Application of adhesion promoter as a thin uniform layer of thickness 0.1 to 0.3 mm, preferably 0.2 mm on the surface of a transfer film (203). The transfer film is made up of cellulose acetate.

TABLE 1

Properties of liquid colour to be used:

| Referral to neutral base | Standard Value |
|---|---|
| Appearance | White viscous fluid |
| Dry content % | 43 +/− 2 |
| pH (1; 10) | 7.5 +/− 1.0 |
| Density g/cm$^2$ | 1.05 +/− 0.05 |

Polyurethane binders and pigments in water dispersion. It is characterized by low viscosity, drying fast, hard dried film, good covering and penetration power. It gives excellent adhesion, wet and dry rub-resistance and cold-flex resistance. Semi-glossy finish with very smooth and sealed look. It can be applied manually or by machine with one or two coats, according to the absorption of the leather. Always it is required to check the adhesion of the product on the leather at least 24 hours after application.

The liquid colour to be coated on the surface of the leather substrate, is applied on the surface of the transfer film by spraying uniformly (204). The colour solidifies as a thin layer, on drying for 1-2 min at room temperature. Further the liquid layer forms a solid colour film (205) or an edge colour sticker film which is transferable to any surface of substrates of the present invention. Thickness of the solid edge color is 0.06 mm to 0.08 mm and transfer film thickness is 0.05 mm.

Placing of the transfer film with the solid colored surface in contact with the substrate surface which needs to be colored (206, 207) Application of heat 110-130° C. and pressure 60-70 PSI kg/cm$^2$ to the surface by placing the substrate with film on the surface. Removal of the transfer or sticker film, wherein after application of temperature and pressure the transfer of colour occurs and the colorless film is removed for disposal (208). The Adhesion promoter according to the embodiments of the present invention is Aziridine in demineralized water at a concentration of 25-35% w/v.

In one embodiment the leather substrate after finishing the colour coating, can be enhanced with a mat coating or a gloss coating.

Example 1

For edge colouring on a leather substrate edge.

The leather substrate is taken. Burnishing of the edges is done on the edges followed by application of adhesion promoter on the edges about thickness of 0.1-0.3 mm, drying at RT for a time period of 1-2 min. Application of adhesion promoter of thickness 0.1-0.2 mm on the Transfer film, made up of cellulose acetate. Spraying of the liquid edge paint on the transfer film to convert it into solid edge colour paint of thickness about 0.06-0.08 mm and drying in shade for 24 hrs.

The spraying of the liquid edge paint is done using a No-5 spray gun. Spray gun should be 13" and 45 to 60 degree angle. After spray it should dry 24 hour under shade not in direct sun. This transfer film is now converted to a solid colour sticker film for transfer of the edge colour on substrates.

Transferring from the transparent paper to the edges of a substrate material. Further, the process of the present invention provides liquid edge paint transferred to the substrate edge for one or more applications. In the process of making liquid edge color to sticker sheet we can make different kind of texture and finish also like mat finish glossy finish. All this finishing can be performed while sparing. Thickness of sticker edge paint should be 0.06 to 0.08 mm. While spray there should not be any bubble on the spraying surface bubble will create uneven surface.

I claim:

1. A method for edge coloring/edge painting of leather substrates, comprising the steps of:
   burnishing the edges of the leather substrate;
   application of adhesion promoter on the edges of the leather substrate in the range 0.1-0.3 mm, and drying for a period of 1-2 min at room temperature;
   application of adhesion promoter on a transfer film;
   spraying or pouring of the liquid edge paint on the transfer film to convert it into solid edge colour paint as a sticker film; and
   transfer of the edge paint sticker film to the edge of the leather substrate followed by application of heat 110-130° C. and pressure 60-70 PSI kg/cm$^2$ and removal of the sticker film,
   wherein the edge paint is a liquid which when poured on the transfer film with adhesion promoter is converted to solid coloured sticker film and is transferred to the edge of leather substrate on application of temperature and pressure.

2. The method for edge coloring/edge painting of leather substrates as claimed in claim 1, the adhesion promoter comprises of Aziridine in demineralized water at a concentration of 25-35% w/v.

3. The method for edge coloring/edge painting of leather substrates as claimed in claim 1, wherein the thickness of the solid colour film on the leather substrate ranges from 0.06 mm to 0.08 mm.

4. A method for edge coloring/edge painting of leather substrates, comprising the steps of:
   burnishing the edges of the leather substrate;
   application of adhesion promoter on the edges of the leather substrate (0.1-0.3 mm thickness) and drying for a period of 1-2 min at room temperature;
   application of adhesion promoter on a transfer film;
   spraying or pouring of the liquid edge paint on the transfer film to convert it into solid edge colour paint of thickness about 0.06-0.08 mm and drying in shade for 24 hrs as a sticker film;
   transfer of the edge paint from the sticker film to the edge of the leather substrate by application of heat 110-130° C. and pressure 60-70 PSI kg/cm$^2$ and removal of the sticker film; and
   application of finishing coat,
   wherein the edge paint is a liquid which when poured on the transfer film with adhesion promoter is converted to solid colour and is transferred to the edge of leather substrate on application of temperature and pressure.

5. The method for edge coloring/edge painting of leather substrates as claimed in claim 4, wherein the finish coat comprises of conventional liquid colour coat.

* * * * *